(12) United States Patent
Moore et al.

(10) Patent No.: US 10,556,978 B1
(45) Date of Patent: Feb. 11, 2020

(54) PROCESS AND CHEMISTRY FOR REDUCING DOLOMITE CONCENTRATIONS IN PHOSPHATE PROCESSING

(71) Applicant: Arr-Maz Products, L.P., Mulberry, FL (US)

(72) Inventors: Lucas R. Moore, Marietta, GA (US); Todd Parker, Lakeland, FL (US); Leon Willis, Bradenton, FL (US)

(73) Assignee: Arr-Maz Products, L.P., Mulberry, FL (US)

( * ) Notice: Subject to any disclaimer, the term of this patent is extended or adjusted under 35 U.S.C. 154(b) by 0 days.

(21) Appl. No.: 16/406,116

(22) Filed: May 8, 2019

Related U.S. Application Data

(62) Division of application No. 14/809,546, filed on Jul. 27, 2015.

(60) Provisional application No. 62/035,546, filed on Aug. 11, 2014.

(51) Int. Cl.
| | |
|---|---|
| *B03D 1/02* | (2006.01) |
| *C08F 220/28* | (2006.01) |
| *B03D 1/016* | (2006.01) |
| *B03D 1/012* | (2006.01) |
| *B03D 1/01* | (2006.01) |
| *B03D 1/008* | (2006.01) |
| *C08F 216/08* | (2006.01) |
| *C08F 220/56* | (2006.01) |
| *C08F 220/06* | (2006.01) |

(52) U.S. Cl.
CPC ............ *C08F 220/28* (2013.01); *B03D 1/016* (2013.01); *B03D 1/008* (2013.01); *B03D 1/01* (2013.01); *B03D 1/012* (2013.01); *B03D 2201/002* (2013.01); *B03D 2201/06* (2013.01); *C08F 220/06* (2013.01); *C08F 220/56* (2013.01); *C08F 2216/085* (2013.01)

(58) Field of Classification Search
CPC .... B03D 1/016; B03D 2201/06; B03D 1/012; B03D 1/02; B03D 1/01; B03D 1/008; B03D 2201/002; C08F 220/28; C08F 2216/085; C08F 220/56; C08F 220/06
USPC .................................................. 209/164–170
See application file for complete search history.

(56) References Cited

U.S. PATENT DOCUMENTS

| | | | | |
|---|---|---|---|---|
| 3,509,021 | A | * 4/1970 | Woodward | ........... C08G 12/046 162/167 |
| 3,928,196 | A | 12/1975 | Persinski | |
| 4,578,267 | A | 3/1986 | Salamone | |
| 4,640,793 | A | 2/1987 | Persinski | |
| 5,152,403 | A | 10/1992 | Patel | |
| 5,531,330 | A | 7/1996 | Nagaraj et al. | |
| 2010/0307753 | A1 | 12/2010 | Rey et al. | |
| 2013/0186838 | A1 | 7/2013 | Sortwell | |
| 2013/0338295 | A1 | 12/2013 | Moore et al. | |

FOREIGN PATENT DOCUMENTS

| | | |
|---|---|---|
| CN | 100392124 | 6/2008 |
| WO | 2012080818 | 6/2012 |

* cited by examiner

*Primary Examiner* — Thomas M Lithgow
(74) *Attorney, Agent, or Firm* — Head, Johnson Kachigian & Wilkinson, PC

(57) ABSTRACT

A magnesium suppressant/flocculant for use in separating dolomite from calcium phosphate. The magnesium suppressant/flocculant may be applied at a mine site prior to subjecting ore fractions to phosphate flotation or at a chemical plant after grinding.

6 Claims, No Drawings

PROCESS AND CHEMISTRY FOR REDUCING DOLOMITE CONCENTRATIONS IN PHOSPHATE PROCESSING

CROSS REFERENCE

This application is based on and claims priority to U.S. patent application Ser. No. 14/809,546 filed Jul. 27, 2015 and U.S. Provisional Patent Application No. 62/035,546 filed Aug. 11, 2014.

BACKGROUND OF THE INVENTION

Field of the Invention

This invention relates generally to a phosphate processing, and more particularly, but not by way of limitation, to a process and chemistry for dolomite suppression during phosphate flotation or for selective flocculation of dolomite from process waters or calcium phosphate, such as Francolite, apatite, etc.

Description of the Related Art

Magnesium is becoming more and more of a concern to phosphate producers. They have known about dolomite ores for decades, but have been able to selectively mine the high quality ores, thus bypassing those rich in the magnesium-containing dolomite. The concern of magnesium comes from the quality or concentration that must be processed at the fertilizer production facilities, who are the customers of the mined phosphate product. During the acidification process of converting phosphate concentrate to phosphoric acid, which is needed for the synthesis of most phosphorus-containing fertilizers, the magnesium can interact with the sulfuric acid, thus increasing the demand and cost for this acidification process. It is also known to produce a range of undesired byproducts such as magnesium pyrophosphate sludge.

At the mine site, the ore generally comes in and goes through various washing and screening stages in an effort to remove the high quality phosphate rock, which is high in particle size. The remaining fractions are put through washing and desliming through a hydrocyclone to further reduce the clays and silica. The remaining size fraction, which is approximately 100 to approximately 1000 microns, will move on to a multistaged flotation where the rougher stage is a phosphate flotation using fatty acid collectors and the second stage is a cleaner (reverse flotation) process where the sand is floated with an amine and the phosphate stays behind and moves on to a dewatering step followed by transferring or being sold to a fertilizer production chemical plant. The dolomite can contain a wide range of particle sizes, but is generally on the higher end of the fraction that is collected for flotation.

Once the product reaches the chemical plant, a size reduction is required and generally occurs in a ball mill. This is necessary for adequate dissolution and acidification during the fertilizer production.

The reason why this problem has not been resolved over these decades is because of the complex nature of coordinating the magnesium in magnesium carbonate versus the calcium in calcium phosphate. Due to the similar structure, magnesium carbonate can also be entrained within the calcium phosphate.

Based on the foregoing, it is desirable to provide a process for reducing dolomite concentrations in phosphate processing.

It is further desirable for such a process to involve adding a magnesium suppressant to the fractions that remain after removing the high quality phosphate rock to change the characteristics of the magnesium carbonate to allow it to be separated more easily from the calcium phosphate during the flotation process.

It is further desirable for such a process to alternately involve adding the magnesium suppressant at the chemical plant during processing, again to change the characteristics of the magnesium carbonate to allow it to be separated from the calcium phosphate.

SUMMARY OF THE INVENTION

In general, in a first aspect, the invention relates to a magnesium suppressant/flocculant for use in reducing dolomite concentrations in phosphate processing, the magnesium suppressant/flocculant is a polymer comprising a base monomer comprising acrylic acid, acrylamide, or a combination of acrylic acid and acrylamide and a functional monomer comprising hydroxyl ethyl methacrylate, 2-acrylamido-2-methyl propane sulfonic acid, 3-allyloxy-1, 2-propanediol, and/or a derivative thereof. The molecular weight of the polymer may be 3,000 daltons to 30,000 daltons when the polymer is a magnesium suppressant, or alternately 200,000 daltons to 10,000,000 daltons when the polymer is a magnesium flocculant. The charge of the functional monomer may be 10% to 30%, or could be as high as 99%.

The magnesium suppressant/flocculant may be used in a method of reducing dolomite concentrations in phosphate processing. The method may comprise adding the magnesium suppressant to phosphate-containing fractions; conditioning the fractions with fatty acid; and subjecting the fractions to a phosphate flotation. Adding the magnesium suppressant to the fractions may prevent magnesium within the fractions from interacting with the fatty acid, which may minimize the extent to which the magnesium interacts with hydrophobic bubbles during the phosphate flotation. The method may further comprise grinding the fractions prior to adding the magnesium suppressant. The grinding may result in a particle size of less than 100 microns.

The magnesium suppressant/flocculant may be used in an alternate method comprising adding magnesium flocculant to phosphate rock during processing at a chemical plant. The method may further comprise transferring the phosphate rock to a clarifier or thickener, where the magnesium flocculant selectively flocculates dolomite in the phosphate rock such that the dolomite settles to the bottom of the clarifier or thickener, and removing the dolomite from the bottom of the clarifier or thickener. Alternately, the method may further comprise rinsing the phosphate rock with pond water to extract soluble magnesium prior to adding the magnesium flocculant, either alone or with coagulant. The method may further comprise grinding the fractions prior to adding the magnesium flocculant, potentially resulting in a particle size of less than 100 microns.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a process and chemistry for reducing dolomite concentrations in phosphate processing.

As discussed above, the typical process for removing phosphate from ore at a mine site involves a four stage process. First, the ore may go through various washing and screening stages to remove large, high quality phosphate rock. Second, the remaining fractions may be washed, deslimed, and put through a hydrocyclone to reduce clays and silica. Third, the remaining fractions, which are typically between 100 and 1000 microns, may be subjected to a phosphate flotation using fatty acid collectors. Fourth, the remaining fractions may be subjected to a reverse flotation process where the sand is floated with an amine and the phosphate stays behind. The phosphate may then move on to a dewatering step before being transferred or sold to a fertilizer production chemical plant.

In a first embodiment, the process for reducing dolomite concentrations may involve adding a step prior to step 3, the first flotation step. Prior to conditioning the phosphate slurry or rock with fatty acid before entering the rougher float cell, a magnesium suppressant may be added. The magnesium suppressant may selectively complex with the magnesium, which may prevent or minimize the magnesium from interacting with the fatty acid, thus minimizing its interaction with the hydrophobic bubbles, which is what removes the phosphate. Essentially, by complexing with the magnesium carbonate, the magnesium suppressant may inhibit the magnesium carbonate from complexing with the fatty acid that would generally make it float due to the similar chemical characteristics to the desired calcium phosphate.

Further improvement may be found by grinding the material prior to adding the magnesium suppressant, as discussed above. The grinding may occur through pipe sheering during transportation or through an external mechanical source, such as a ball mill. The smaller particle size may make the magnesium more liberated and thus easier to complex. The grinding may result in a particle size of less than 100 microns.

In a second embodiment, the process for reducing dolomite concentrations may occur at the chemical plant. During processing, the phosphate rock may be transferred into a clarifier or thickener. During this step, the magnesium suppressant may be added to selectively flocculate the dolomite from the calcium phosphate. The dolomite may then settle to the bottom of the thickener or clarifier and be removed from the bottom and transferred to a tailings pond while the calcium phosphate is separated. Alternately, the phosphate product entering the chemical plant may be rinsed with pond water, which may extract much of the magnesium as soluble magnesium. The calcium phosphate may be filtered or removed by some other means. The now magnesium enriched water may then be treated with either the magnesium suppressant or a combination or coagulant and magnesium suppressant. In both in-plant options, the magnesium suppressant should complex with the magnesium carbonate preferentially over calcium phosphate and settle, thus separating from the calcium phosphate.

As with the first embodiment, further improvement may be found by decreasing the size of the material prior to adding the magnesium suppressant. Once the product reaches the chemical plant, a size reduction may be required and may occur in a ball mill. This is often necessary for adequate dissolution and acidification during the fertilizer production. During the grinding, not only is the calcium phosphate ground smaller for the required processing, but the dolomite is also ground smaller. This may be beneficial for the application of the present invention. The smaller particle size may make the magnesium more liberated and thus easier to complex. The grinding may result in a particle size of less than 100 microns.

The magnesium suppressant may be a polymer. In particular, the magnesium suppressant may be at least a copolymer if not a tertpolymer. The base chemistry may be acrylic acid, acrylamide, or a combination of acrylic acid and acrylamide. The functionality for the magnesium complexation may come from adding one or more of the following monomers to the polymer: hydroxyl ethyl methacrylate, 2-acrylamido-2-methyl propane sulfonic acid, 3-allyloxy-1, 2-propanediol, and/or a derivative thereof. When used during the flotation stage, the molecular weight of the polymer may be from around 3,000 daltons to 30,000 daltons, but may go as high as 500,000 daltons. When used at the chemical plant, the molecular weight of the polymer may be from around 200,000 daltons to millions of daltons, but may go as low as 20,000 daltons. The charge of the functionalized monomer may be around 10% to 30%, but could be higher or lower.

Whereas, the devices and methods have been described in relation to the drawings and claims, it should be understood that other and further modifications, apart from those shown or suggested herein, may be made within the spirit and scope of this invention.

What is claimed is:

1. A method of reducing dolomite concentrations in phosphate processing, the method comprising:
   adding magnesium flocculant to phosphate rock during processing at a chemical plant; and wherein the magnesium flocculant is a polymer comprising:
   a base monomer comprising acrylic acid, acrylamide, or a combination of acrylic acid and acrylamide: and
   a functional monomer comprising hydroxyl ethyl methacrylate, 2-acrylamido-2-propane sulfonic acid, 3-allyl-1, 2-propanediol, and/or a derivative thereof.

2. The method of claim 1, further comprising:
   transferring the phosphate rock to a clarifier or thickener, where the magnesium flocculant selectively flocculates dolomite in the phosphate rock such that the dolomite settles to the bottom of the clarifier or thickener; and
   removing the dolomite from the bottom of the clarifier or thickener.

3. The method of claim 1, further comprising rinsing the phosphate rock with pond water to extract soluble magnesium prior to adding the magnesium flocculant.

4. The method of claim 3, further comprising adding coagulant with the magnesium flocculant.

5. The method of claim 1, further comprising grinding the fractions prior to adding the magnesium flocculant.

6. The method of claim 5 where the grinding results in a particle size of less than 100 microns.

* * * * *